United States Patent
Frutuoso et al.

(10) Patent No.: US 7,340,426 B1
(45) Date of Patent: Mar. 4, 2008

(54) EVENT-TRIGGERED TRANSACTION PROCESSING FOR ELECTRONIC DATA INTERCHANGE

(75) Inventors: Joseph Frutuoso, Wethersheld, CT (US); David Nadeau, Broad Brook, CT (US); Robert C. Larew, Ellington, CT (US)

(73) Assignee: Computer Sciences Corporation, Austin, TX (US)

( * ) Notice: Subject to any disclaimer, the term of this patent is extended or adjusted under 35 U.S.C. 154(b) by 0 days.

(21) Appl. No.: 09/365,066

(22) Filed: Jul. 30, 1999

(51) Int. Cl.
*G06Q 40/00* (2006.01)
(52) U.S. Cl. ............... 705/37; 705/2; 705/3; 705/4; 705/26; 705/27; 705/35; 705/36; 705/38; 705/39; 709/200; 707/101; 707/102
(58) Field of Classification Search ............. 705/2, 705/3, 4, 26, 27, 37, 38, 36, 35, 39; 709/200; 707/107, 102
See application file for complete search history.

(56) References Cited

U.S. PATENT DOCUMENTS

| | | |
|---|---|---|
| 4,878,167 A | 10/1989 | Kapulka et al. |
| 5,099,422 A | 3/1992 | Foresman et al. |
| 5,191,522 A | 3/1993 | Bosco et al. |
| 5,201,044 A | 4/1993 | Frey, Jr. et al. |
| 5,233,513 A | 8/1993 | Doyle |
| 5,386,566 A | 1/1995 | Hamanaka et al. |
| 5,394,555 A | 2/1995 | Hunter et al. |
| 5,434,994 A | 7/1995 | Shaheen et al. |

(Continued)

FOREIGN PATENT DOCUMENTS

EP  0 280 773  9/1988

(Continued)

OTHER PUBLICATIONS

"@ Fault A Commitment to Consistency," Computer Sciences Corporation, Copyright 2000, pp. 1-2.

(Continued)

*Primary Examiner*—Nga Nguyen
(74) *Attorney, Agent, or Firm*—Meyertons, Hood, Kivlin, Kowert & Goetzel, P.C.; Eric B. Meyertons

(57) ABSTRACT

A method and system for automating data exchange processing by using event-triggered transaction processing. Transaction data may be exchanged electronically with industry clearinghouses or in-house administration systems. A trading relationship between trading partners is stored in a trading relationship database. At least one trading partner is a sending trading partner and at least one trading partner is a receiving trading partner with respect to a transaction between the sender and receiver. Maps and rules may be created and stored with respect to transactions and/or trading partners. An incoming transaction is received through an industry clearinghouse from the at least one sending partner as identified in the trading relationship. In response to receiving the incoming transaction, additional information is read from an administration system specified by a map in order to complete the processing of the transaction. The incoming transaction is a triggering event which prompts the obtaining of additional data. The additional data may be obtained according to user-specified business rules. In response to obtaining additional information, an outgoing transaction which may include the additional data is generated and sent to the receiving trading partner through the industry clearinghouse.

47 Claims, 11 Drawing Sheets

U.S. PATENT DOCUMENTS

| | | | |
|---|---|---|---|
| 5,444,841 A * | 8/1995 | Glaser et al. | 709/200 |
| 5,455,947 A | 10/1995 | Suzuki et al. | |
| 5,483,632 A | 1/1996 | Kuwamoto et al. | |
| 5,499,330 A | 3/1996 | Lucas et al. | |
| 5,504,674 A | 4/1996 | Chen et al. | |
| 5,523,942 A | 6/1996 | Tyler et al. | |
| 5,550,976 A | 8/1996 | Henderson et al. | |
| 5,586,310 A | 12/1996 | Sharman | |
| 5,638,508 A | 6/1997 | Kanai et al. | |
| 5,689,706 A | 11/1997 | Rao et al. | |
| 5,724,575 A * | 3/1998 | Hoover et al. | 707/10 |
| 5,745,901 A | 4/1998 | Entner et al. | |
| 5,761,661 A | 6/1998 | Coussens et al. | |
| 5,768,505 A | 6/1998 | Gilchrist et al. | |
| 5,768,506 A | 6/1998 | Randell | |
| 5,794,207 A * | 8/1998 | Walker et al. | 705/1 |
| 5,797,134 A | 8/1998 | McMillan et al. | |
| 5,812,669 A | 9/1998 | Jenkins et al. | |
| 5,832,481 A | 11/1998 | Sheffield | |
| 5,870,711 A | 2/1999 | Huffman | |
| 5,873,066 A | 2/1999 | Underwood et al. | |
| 5,903,873 A * | 5/1999 | Peterson et al. | 705/4 |
| 5,907,848 A | 5/1999 | Zaiken et al. | |
| 5,909,683 A | 6/1999 | Miginiac et al. | |
| 5,924,077 A | 7/1999 | Beach et al. | |
| 5,930,759 A * | 7/1999 | Moore et al. | 705/2 |
| 5,933,816 A | 8/1999 | Zeanah et al. | |
| 5,937,189 A | 8/1999 | Branson et al. | |
| 5,950,169 A * | 9/1999 | Borghesi et al. | 705/4 |
| 5,956,687 A * | 9/1999 | Wamsley et al. | 705/4 |
| 5,987,434 A | 11/1999 | Libman | |
| 5,991,733 A | 11/1999 | Aleia et al. | |
| 5,995,939 A * | 11/1999 | Berman et al. | 705/4 |
| 6,003,007 A * | 12/1999 | DiRienzo | 705/4 |
| 6,038,393 A | 3/2000 | Iyengar et al. | |
| 6,049,665 A | 4/2000 | Branson et al. | |
| 6,064,983 A | 5/2000 | Koehler | |
| 6,081,832 A | 6/2000 | Gilchrist et al. | |
| 6,088,677 A * | 7/2000 | Spurgeon | 705/4 |
| 6,092,049 A | 7/2000 | Chislenko et al. | |
| 6,105,007 A | 8/2000 | Norris | |
| 6,115,690 A | 9/2000 | Wong | |
| 6,134,582 A | 10/2000 | Kennedy | |
| 6,163,770 A | 12/2000 | Gamble et al. | |
| 6,185,540 B1 | 2/2001 | Schreitmueller et al. | |
| 6,208,973 B1 * | 3/2001 | Boyer et al. | 705/4 |
| 6,226,623 B1 | 5/2001 | Schein et al. | |
| 6,236,975 B1 | 5/2001 | Boe et al. | |
| 6,336,096 B1 | 1/2002 | Jernberg | |
| 6,408,303 B1 * | 6/2002 | Richards | 707/102 |

FOREIGN PATENT DOCUMENTS

| | | |
|---|---|---|
| EP | 0 465 018 | 1/1992 |
| EP | 0 926 608 | 6/1999 |

OTHER PUBLICATIONS

Merlin, Jr., William F., "Collision Course With the Colossus Program: How to Deal With It," The Merlin Law Group May 2000, Tampa, FL, pp. 1-17.

Merlin, Jr., William F., "Colossus: What We Know Today," The Merlin Law Group, Aug. 2000, Tampa, FL, pp. 1-8.

Merlin, Jr., William F., "Overcoming Allstate's Trade Secrets and Work-Product Objections," The Merlin Law Group Mar. 2000, Tampa, FL, pp. 1-31.

Mead, Jay, "Technical Communication," Aug. 1998, V. 45, N. 3, pp. 353-380.

Scopus and Entrust Technologies to Deliver World's First Secure Customer Care Solution for the Financial Services Market; PR Newswire dated Nov. 5, 1997.

Borland, Russel, "Running Microsoft Outlook 97," Microsoft Press, 1997.

Juhl, Randy P., "The OTC Revolution;" Drugtopics.com; Mar. 3, 1997, pp. 1-9.

Continuum Connections, vol. I, No. 1, The Continuum Company, Inc., Nov. 1991, 16 pages.

Continuum Connections, vol. I, No. 2, The Continuum Company, Inc., Jan./Feb. 1992, 17 pages.

Continuum Connections, vol. I, No. 3, The Continuum Company, Inc., Mar./Apr. 1992, 16 pages.

Continuum Connections, vol. I, No. 4, The Continuum Company, Inc., Jul./Aug. 1992, 15 pages.

Continuum Connections, vol. II, No. 1, The Continuum Company, Inc., Oct./Nov. 1992, 16 pages.

Continuum Connections, vol. II, No. 2, The Continuum Company, Inc., Dec./Jan. 1993, 24 pages.

Continuum Connections, vol. II, No. 3, The Continuum Company, Inc., Mar./Apr. 1993, 16 pages.

Continuum Connections, vol. II, No. 4, The Continuum Company, Inc., Jul./Aug. 1993, 16 pages.

Continuum Connections, vol. II, No. 5, The Continuum Company, Inc., Nov./Dec. 1993, 20 pages.

Continuum Connections, vol. II, No. 6, The Continuum Company, Inc., Jan./Feb. 1994, 19 pages.

Continuum Connections, vol. III, No. 1, The Continuum Company, Inc., Mar./Apr. 1994, 24 pages.

Continuum Connections, vol. III, No. 2, The Continuum Company, Inc., Nov./Dec. 1994, 20 pages.

Continuum Connections, vol. III, No. 3, The Continuum Company, Inc., Mar./Apr. 1995, 16 pages.

Continuum Connections to the Americas, vol. 1, No. 1, The Continuum Company, Inc., Sep. 1995, 49 pages.

Continuum Connections, vol. III, No. 4, The Continuum Company, Inc., Oct./Nov. 1995, 24 pages.

Continuum Connections to the Americas, vol. 2, No. 1, The Continuum Company, Inc., Jan. 1996, 59 pages.

Continuum Connections to the Americas, vol. 2, No. 2, The Continuum Company, Inc., Mar. 1996, 59 pages.

Continuum Connections to the Americas, vol. 2, No. 3, The Continuum Company, Inc., May 1996, 51 pages.

Continuum Connections to the Americas, vol. 2, No. 4, The Continuum Company, Inc., Jul. 1996, 55 pages.

Continuum Connections to the Americas, vol. 2, No. 5, The Continuum Company, Inc., Sep. 1996, 59 pages.

Connections to the Americas, vol. 3, No. 1, CSC Continuum, Jan. 1997, 55 pages.

Connections to the Americas, vol. 3, No. 2, CSC Continuum, Feb. 1997, 55 pages.

Connections to the Americas, vol. 3, No. 3, CSC Continuum, Mar. 1997, 48 pages.

Connections to the Americas, vol. 3, No. 4, CSC Continuum, Apr. 1997, 40 pages.

Connections to the Americas, vol. 3, No. 5, Computer Sciences Corporation, May/Jun. 1997, 66 pages.

Connections to the Americas, vol. 3, No. 6, Computer Sciences Corporation, Jul./Aug. 1997, 56 pages.

Connections to the Americas, vol. 3, No. 7, Computer Sciences Corporation, Sep./Oct. 1997, 76 pages.

Connections to the Americas, vol. 4, No. 1, Computer Sciences Corporation, Jan. 1998, 64 pages.

Connections to the Americas, vol. 4, No. 2, Computer Sciences Corporation, Feb./Mar. 1998, 50 pages.

Connections to the Americas, vol. 4, No. 3, Computer Sciences Corporation, May/Jun. 1998, 48 pages.

Connections to the Americas, vol. 4, No. 4, Computer Sciences Corporation, Sep./Oct. 1998, 62 pages.

Insurance Connections, Computer Sciences Corporations, Feb./Mar. 1999, 52 pages.

Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.

* cited by examiner

EVENT-TRIGGERED TRANSACTION PROCESSING FOR ELECTRONIC DATA INTERCHANGE

BACKGROUND OF THE INVENTION

1. Field of the Invention

The present invention relates to computer software, and more particularly to electronic transaction processing between distributed computer systems.

2. Description of the Related Art

Electronic data interchange (EDI) generally refers to the process of transmitting and/or receiving data in a predetermined digital format from one computer system to another computer system. EDI can be a fast, inexpensive, and relatively safe method of processing business-related transactions. For example, EDI can be used to send purchase orders, invoices, shipping notices, and other frequently used electronic business documents. EDI can greatly reduce errors in transaction processing by eliminating the need for manual entry of data in hardcopy business documents. EDI is therefore an advantageous method of processing business transactions, and businesses in particular fields such as insurance often expect to communicate with each other electronically.

In order for their computers to communicate effectively with one another, EDI participants must follow standards for the format and transmission of electronic data. Several standards maintenance organizations have set forth EDI standards. Examples of such standards and the associated maintenance organizations include ANSI X12, which was developed by the American National Standards Institute; the Uniform Communications Standards (UCS); the TDCC standard developed by the Transportation Data Coordinating Committee; and UN-EDIFACT (EDI for Administration, Commerce, and Transport), an international standard based on ANSI X12 and Trade Data Interchange standards commonly used in Europe.

The National Securities Clearing Corporation (NSCC) is another organization that promulgates standards for EDI. The NSCC maintains the Annuity Processing Service (APS), an insurance industry clearinghouse which provides a flexible system for the transmission of information to and from trading partners such as insurance carriers, broker/dealers, agents, banks, and other organizations. The Annuity Processing Service may also be referred to as the Insurance Processing Service (IPS). Trading partners who are members of the NSCC may use the APS clearinghouse, for example, to transmit annuity information and clear associated monies so that transactions can be finalized quickly. As used herein, "trading partners" refer to business entities who transact business with one another through electronic data interchange. A "sending trading partner" is a trading partner who electronically sends data related to a transaction. Often, the sending trading partner is the trading partner who initiates the transaction. A "receiving trading partner" is a trading partner who electronically receives data related to a transaction. For some transactions, a sending trading partner and a receiving trading partner may be the same entity.

To enable the electronic processing of transactions through the APS, the NSCC provides standards for data formats for a variety of common transactions. As used herein, a "transaction" is any business event that is processed electronically. Transactions, including those supported by the APS, include business events such as deposits, applications, commission payments or settlements, positions and valuations (full value and refreshed value), annuity asset pricing, financial activity reporting, and other suitable events. Positions and valuations full refresh (PVF) is a transaction involving the financial and non-financial information about an annuity contract at a particular point in time. The PVF includes contract data such as valuations, replacements, producer information, owner information, and payor information. Positions and valuations focused refresh (PFF) is also a transaction involving the financial and non-financial information about an annuity contract at a particular point in time. The PFF record is a shorter version of the PVF record and includes the data and value for each contract. Annuity asset pricing (AAP) is a transaction involving the pricing or unit value of the underlying variable investment funds supporting a contract.

The APS clearinghouse enables trading partners to transmit data to a variety of other trading partners without establishing proprietary networks. However, the adherence of trading partners to industry standard data formats is not enough to automate all transactions. Existing approaches often require the intervention of a skilled computer programmer for certain tasks and transactions. For example, in order to process a transaction such as a commission payment request received electronically from a broker/dealer, an insurance carrier often must write, test, and install a custom program in a programming language such as COBOL to tell its payment system to obtain the necessary broker-related information from another source, such as a particular database. This approach towards EDI tends to be wasteful, time-consuming, and expensive.

For at least the foregoing reasons, there is a need for an improved system and method for processing transactions in a more efficient manner.

SUMMARY OF THE INVENTION

The present invention provides various embodiments of a method and system for automating data exchange processing. In one embodiment, a trading relationship between trading partners is stored in a trading relationship database. Trading partners may include agents, broker/dealers, banks, and other suitable entities. In the insurance field, for example, trading partners may include insurance companies, insurance agents, and insurance broker/dealers. At least one trading partner is a sending trading partner and at least one trading partner is a receiving trading partner with respect to a transaction between the at least one sending trading partner and the at least one receiving trading partner. Maps and business rules may also be defined and stored with regard to particular types of transactions and particular trading partners. Maps define sources of additional data used to process a transaction, such as fields within an administration system. Business rules determine conditions and criteria to be met by additional data from an administration system specified in a map. In one embodiment, the maps are created with a drag-and-drop mapping of incoming transactions to outgoing transactions in a graphical user interface. The rules may also be defined by a user in a user interface.

An incoming transaction may be received from the at least one sending partner as identified in a trading relationship. In one embodiment, the incoming transaction may be received through the Annuity Processing Service of the NSCC. The receiving of incoming transactions may take place according to a schedule.

In response to receiving the incoming transaction from the at least one sending trading partner, additional information may be read from an administration system in order to complete the processing of the transaction. One or more maps may determine the source of the additional data within the administration system. One or more business rules may be executed against records in the administration system to specify the additional information from the administration system. In various embodiments, the business rules may include combinations of keywords and/or logical operators. Keywords may include terms such as sending trading partner identifiers, receiving trading partner identifiers, administration system identifiers, transaction identifiers, and transaction statuses. Logical operators may include "AND", "OR", "NOT", "EQUALS", "NOT EQUAL TO", "GREATER THAN", and "LESS THAN". The business rule may include a string of at least one keyword and at least one logical operator which is constructed by a user of the computer system. The business rule may then be entered into the computer system by a user via a user interface and subsequently stored in a database. In one embodiment, the business rule, once constructed, is entered much like one would enter a search string into a search engine. The business rules may therefore function as search criteria for additional information to be obtained to complete a transaction. By allowing a user to construct and enter different business rules which are subsequently used to generate different outgoing transactions, the system and method for event-triggered transaction processing is adjustable to process an indefinite number of types of transactions without the intervention of a programmer writing specialized programs.

In one embodiment, the additional data may be obtained from more than one administration system. The administration system may be an in-house administration system such as an annuity administration system. In one embodiment, the administration system is the VANTAGE-ONE® annuity administration system available from Computer Sciences Corporation. Additional information may be obtained according to a schedule. The schedule may include a particular time and date or a frequency. The incoming transaction may therefore include a triggering event which prompts the obtaining of additional data.

An outgoing transaction is generated in response to obtaining additional information from an administration system. The outgoing transaction may include the additional data obtained from the administration system. The outgoing transaction is sent to the at least one receiving trading partner. The sending of outgoing transactions may take place according to a schedule which may specify a date and time or a frequency at which outgoing transactions are to be sent. The outgoing transaction may be queued for sending along with other outgoing transactions. The outgoing transaction may be reformatted into an industry standard data format by an adapter. In one embodiment, the outgoing transaction may be sent through the Annuity Processing Service of the NSCC, and the outgoing transaction may be reformatted into an NSCC-standard data format.

Figure 1:
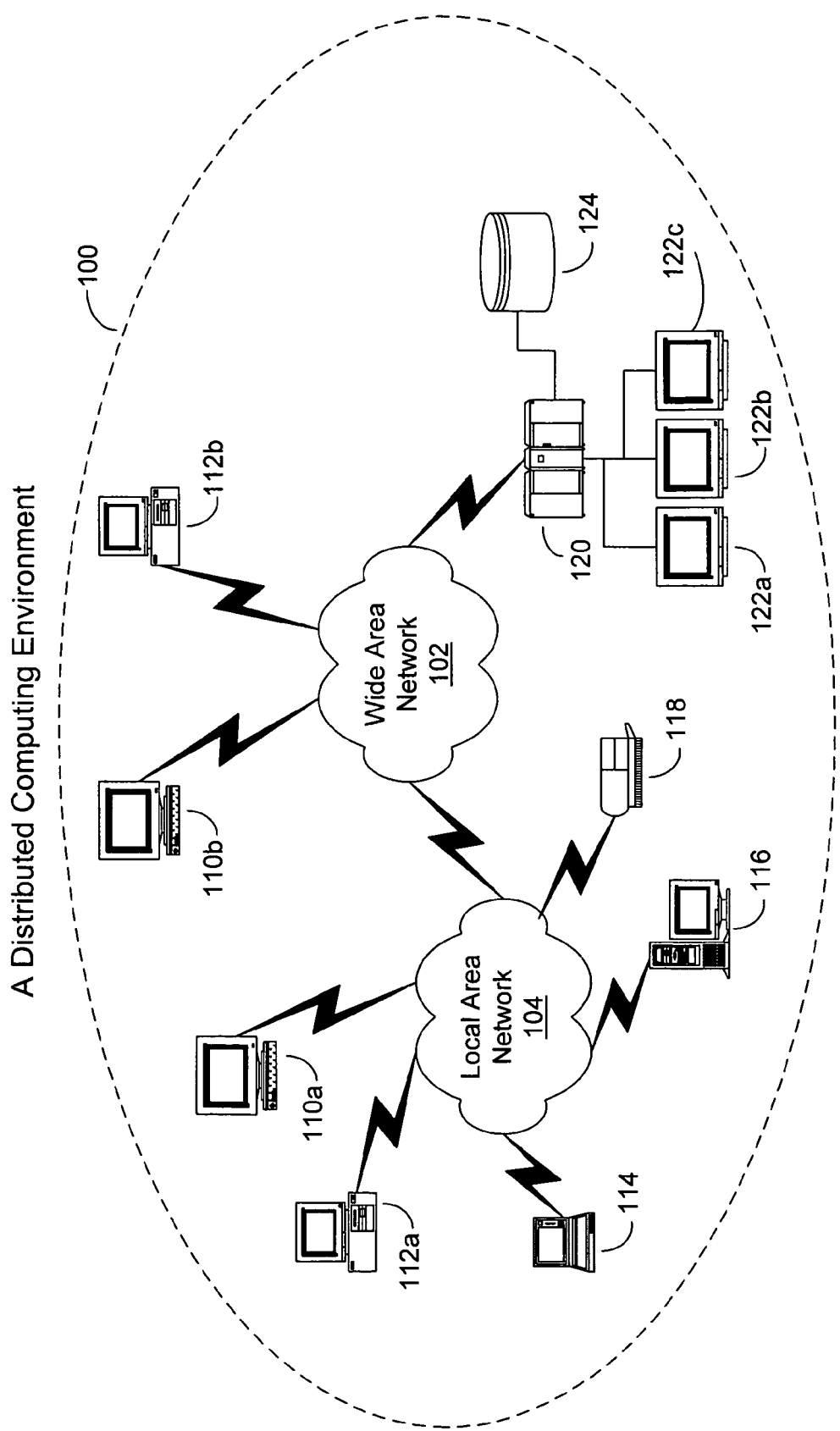
FIG. 1 is a network diagram of an illustrative distributed computing environment which is suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

FIG. 1: A Distributed Computing Environment

FIG. 1 illustrates a distributed or enterprise computing environment according to one embodiment. A distributed computer system or enterprise 100 includes a plurality of computer systems which are interconnected through one or more networks. Although one particular embodiment is shown in FIG. 1, the distributed computer system 100 may include a variety of heterogeneous computer systems and networks which are interconnected in a variety of ways and which run a variety of software applications and/or operating system software.

One or more local area networks (LANs) 104 may be included in the enterprise 100. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). As illustrated in FIG. 1, the distributed computer system 100 may include one LAN 104. However, in alternate configurations the distributed computer system 100 may include a plurality of LANs 104 which are coupled to one another through a wide area network (WAN) 102. A WAN 102 is a network that spans a relatively large geographical area.

Each LAN 104 includes a plurality of interconnected computer systems and optionally one or more other devices: for example, one or more workstations 110*a*, one or more personal computers 112*a*, one or more laptop or notebook computer systems 114, one or more server computer systems 116, and one or more network printers 118. As illustrated in FIG. 1, an example LAN 104 may include one of each of computer systems 110*a*, 112*a*, 114, and 116, and one printer 118. The LAN 104 may be coupled to other computer systems and/or other devices and/or other LANs 104 through a WAN 102.

One or more mainframe computer systems 120 may be coupled to the distributed computer system 100. As shown in FIG. 1, the mainframe 120 may be coupled to the distributed computer system 100 through the WAN 102, but alternatively one or more mainframes 120 may be coupled to the distributed computer system 100 through one or more LANs 104. As shown, the mainframe 120 may be coupled to a storage device or file server 124 and mainframe terminals 122*a*, 122*b*, and 122*c*. The mainframe terminals 122*a*, 122*b*, and 122*c* may access data stored in the storage device or file server 124 coupled to or included in the mainframe computer system 120.

The distributed computer system 100 may also include one or more computer systems which are connected to the distributed computer system 100 through the WAN 102: as illustrated, a workstation 110*b* and a personal computer 112*b*. In other words, the enterprise 100 may optionally include one or more computer systems which are not coupled to the distributed computer system 100 through a LAN 104. For example, the distributed computer system 100 may include computer systems which are geographically remote and connected to the distributed computer system 100 through the Internet.

In one embodiment, the enterprise or distributed computer system 100 includes computer systems for a plurality of trading partners, an industry clearinghouse system, and a computer system for transaction processing. The computer systems for the trading partners, for the industry clearinghouse, and for transaction processing may be computer systems as shown in FIG. 1 and may be coupled to one another through a WAN 102. The trading partners and computer system for transaction processing are configured to exchange transaction data electronically with one another through the industry clearinghouse. The industry clearinghouse may require transaction data to be exchanged in a particular data format. For example, in one embodiment the industry clearinghouse is the Annuity Processing System (APS) or Insurance Processing System (IPS) of the National Securities Clearing Corporation (NSCC). In one embodiment, the computer system for transaction processing includes industry adapters to convert or translate incoming transaction data from NSCC data formats or other standard data formats and outgoing transaction data to NSCC data formats or other standard data formats. As used herein, an "industry adapter" includes a computer program, utility, driver, or interface which translates or converts data to or from a standardized data format.

Figure 2:
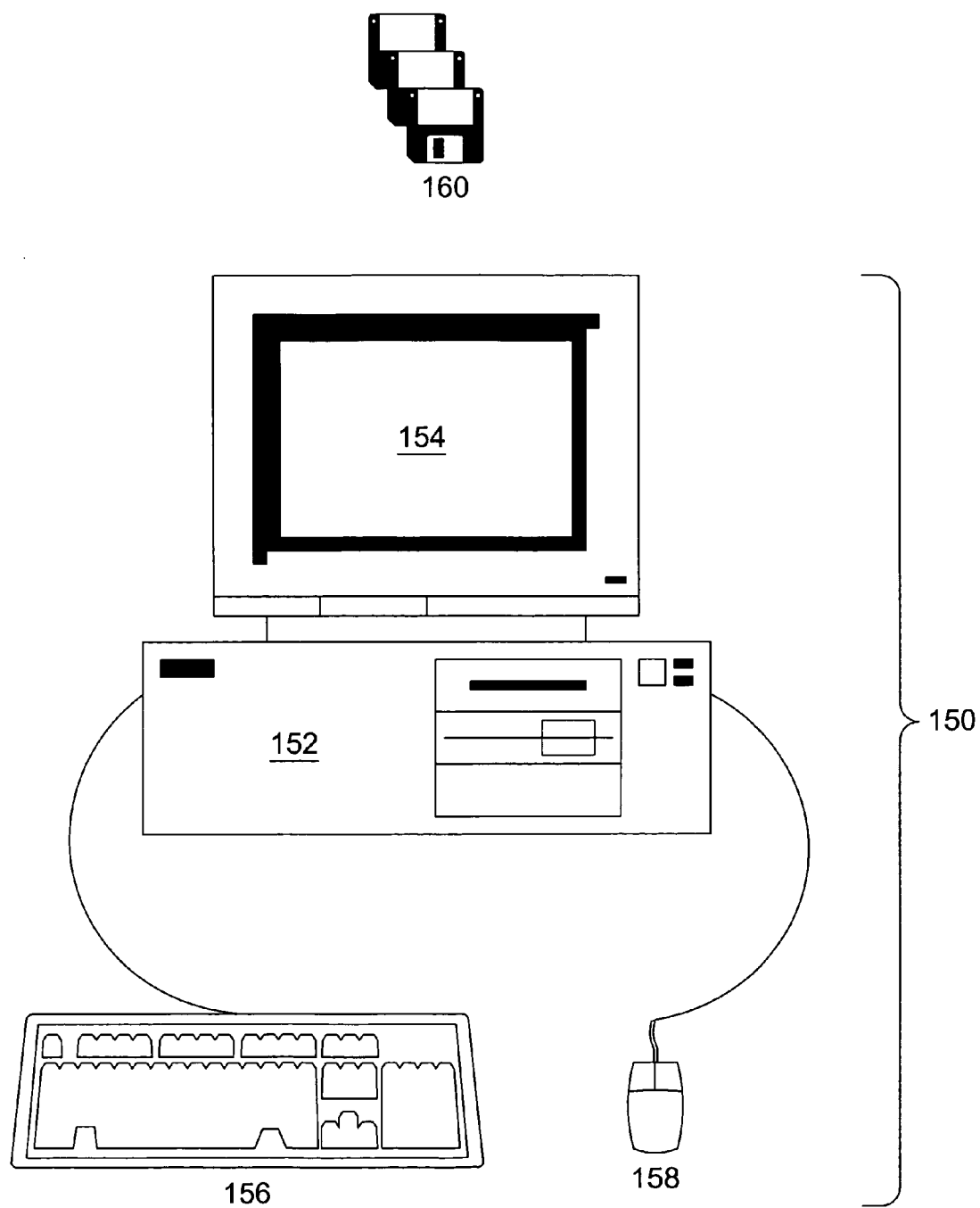
FIG. 2 is an illustration of a typical computer system which is suitable for implementing various embodiments.

FIG. 2: A Typical Computer System

FIG. 2 illustrates a typical computer system 150 which is suitable for implementing various embodiments. Each computer system 150 typically includes components such as a CPU 152 with an associated memory medium such as floppy disks 160. The memory medium may store program instructions for computer programs, wherein the program instructions are executable by the CPU 152. The computer system 150 may further include a display device such as a monitor 154, an alphanumeric input device such as a keyboard 156, and a directional input device such as a mouse 158. The computer system 150 is operable to execute the computer programs to implement event-triggered transaction processing as described herein.

The computer system 150 preferably includes a memory medium on which computer programs according to various embodiments may be stored. The term "memory medium" is intended to include an installation medium, e.g., a CD-ROM, or floppy disks 160, a computer system memory such as DRAM, SRAM, EDO RAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer system 150 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU 152, executing code and data from the memory medium includes a means for creating and executing the software program or programs according to the methods and/or block diagrams described below.

The computer system for transaction processing may be a typical computer system 150 as illustrated in FIG. 2. As will be discussed in greater detail below, the computer system for transaction processing is operable to receive incoming transaction data from another computer system, process the transaction data, and generate and send outgoing transaction data to another computer system. In one embodiment, transaction data is received from trading partners and sent to trading partners through an industry clearinghouse system. In one embodiment, the NSCC's Annuity Processing Service (APS) clearinghouse is used as an industry clearinghouse for exchange of the transaction data. As used herein, transactions may include business events such as deposits, applications, commission payments or settlements, positions and valuations (full value and refreshed value), annuity asset pricing, insurance pricing, securities reporting, financial activity reporting, and other suitable events supported by the APS clearinghouse. Transactions may generally include insurance-related transactions. As used herein, an "insurance-related transaction" is a transaction involving insurance policies, contracts, funds, valuations, companies, agencies, agents, or broker/dealers. The computer system for transaction processing may be maintained by an organization such as an insurance carrier.

In one embodiment, the computer system for transaction processing is coupled to one or more administration systems. Administration systems may include, for example, database management systems or annuity administration systems such as VANTAGE-ONE from Computer Sciences Corporation. The administration systems may be in-house systems, external systems, or a combination of in-house and external systems.

As used herein, an "administration system" includes any computer-based system that provides data needed for a transaction. If the transaction is a positions and valuations full refresh (PVF) transaction, for example, then data needed to complete the PVF transaction may include contract data or policy information such as valuations, replacements, producer, owner, and payor information. The administration system may contain the policy information necessary to complete this PVF transaction. As another example, if the transaction is an annuity asset pricing (AAP) transaction, then the computer system for transaction processing is expected to tell the trading partner the pricing or unit values of the underlying investment funds supporting a contract. This pricing is required to calculate the dollar value of an annuity contract and financial transactions. Typically, the records are generated each business day and contain information for each investment fund used by a company. An annuity administration system such as VANTAGE-ONE may include the data required to create and support AAP transactions. For example, the administration system may include a fund information table which provides details about the investment fund. The administration system may also include a unit value history file which contains the unit values for each business day that prices are available.

Figure 3:
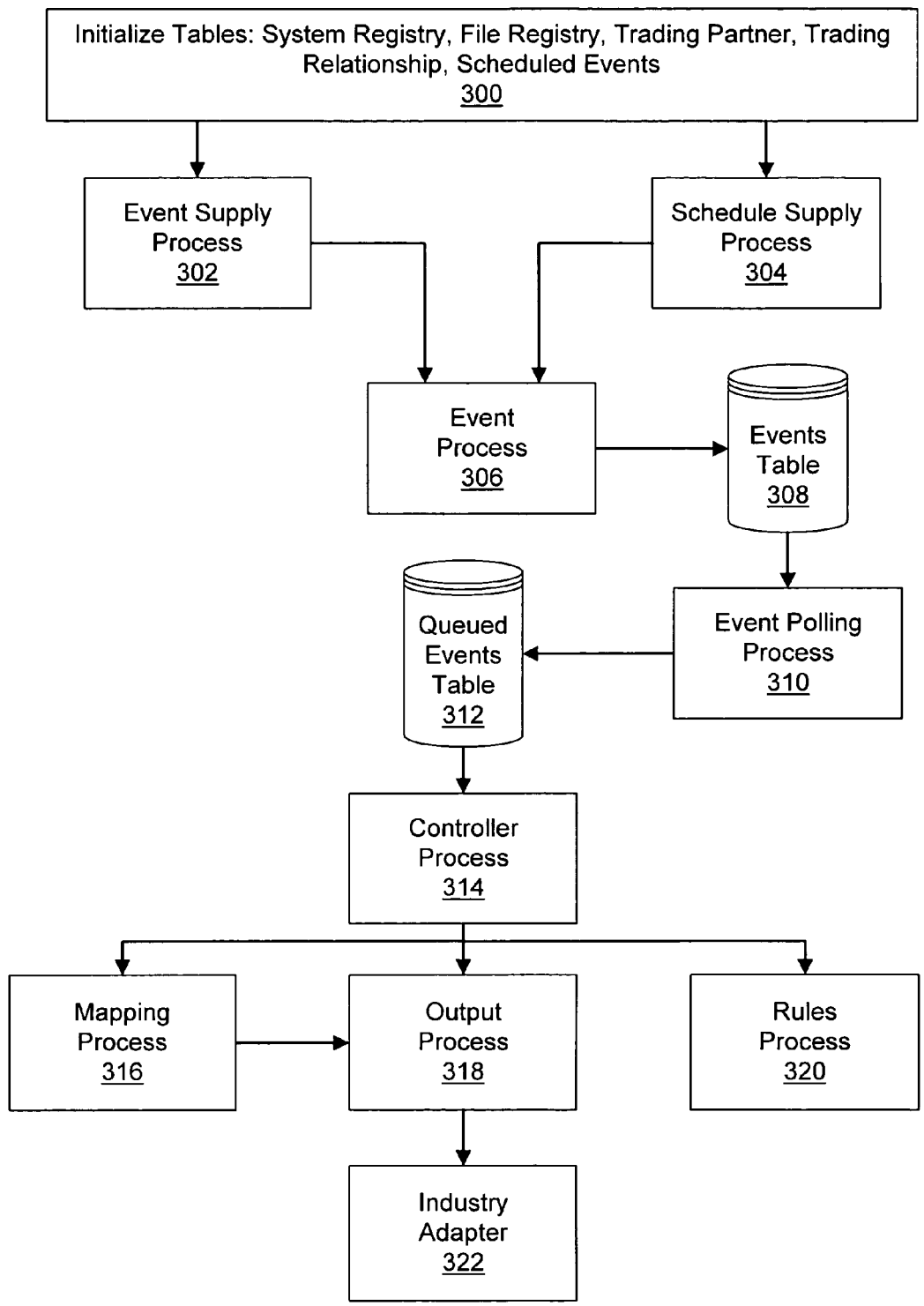
FIG. 3 is a block diagram illustrating an overview of the event-triggered transaction processing according to one embodiment.

FIG. 3: Overview of Event-Triggered Transaction Processing

FIG. 3 is a block diagram showing an overview of the system and method for event-triggered transaction processing. As shown in FIG. 3, according to one embodiment, an initial configuration process may include the initialization 300 of a set of tables with appropriate data. These tables may include a system registry table, a file registry table, an event registry, a trading partner table, a trading relationship table, and a scheduled events table. In other embodiments, these and other tables may be initialized at other points in time, at or before the time that the data in the tables is needed by the system and method for event-triggered transaction processing. These and other tables may be implemented and stored in a database. As used herein, a "database" is a computer-based system for storing and retrieving data. The contents of these tables are discussed below.

In one embodiment, the relationship of several processes and tables is as follows. When an incoming transaction is received from a sending trading partner, a corresponding event is generated. As used herein, an "event" is a computer record corresponding to a business transaction or an action taken in accordance with a business transaction. The event supply process 302 passes events to the event process 306. The schedule supply process 304 passes schedules for events to the event process 306. The event process 306 populates the events table 308 with the events and schedules. The event polling process 310 reads events and schedules from the events table 308 and queues events to the queued events table 312. The controller process 314 reads data from the queued events table 312 and initiates the rules process 320, the mapping process 316, and the output process 318. The event polling process 310 provides the ability to determine which events are selected and controls when these events are queued for mapping. The controller process 314 directs the processing of events by applying the appropriate rules and mapping instructions. A data mapper may define and build rules to be used by the mapping process 316. The mapping process 316 carries out or executes the rules defined and built in the data mapper. By applying user-defined business rules in this way, additional data may be obtained from administration systems to complete transactions. The rules process 320 interprets the rules and determines if processing of events or maps may continue. The output process 318 provides a central storage area for all records processed, including outgoing transactions built in the preceding processes. The outgoing transaction may be sent through an industry adapter 322 to the receiving trading partner, directly or indirectly through an industry clearinghouse. These processes and tables are discussed in greater detail below.

Figure 4:
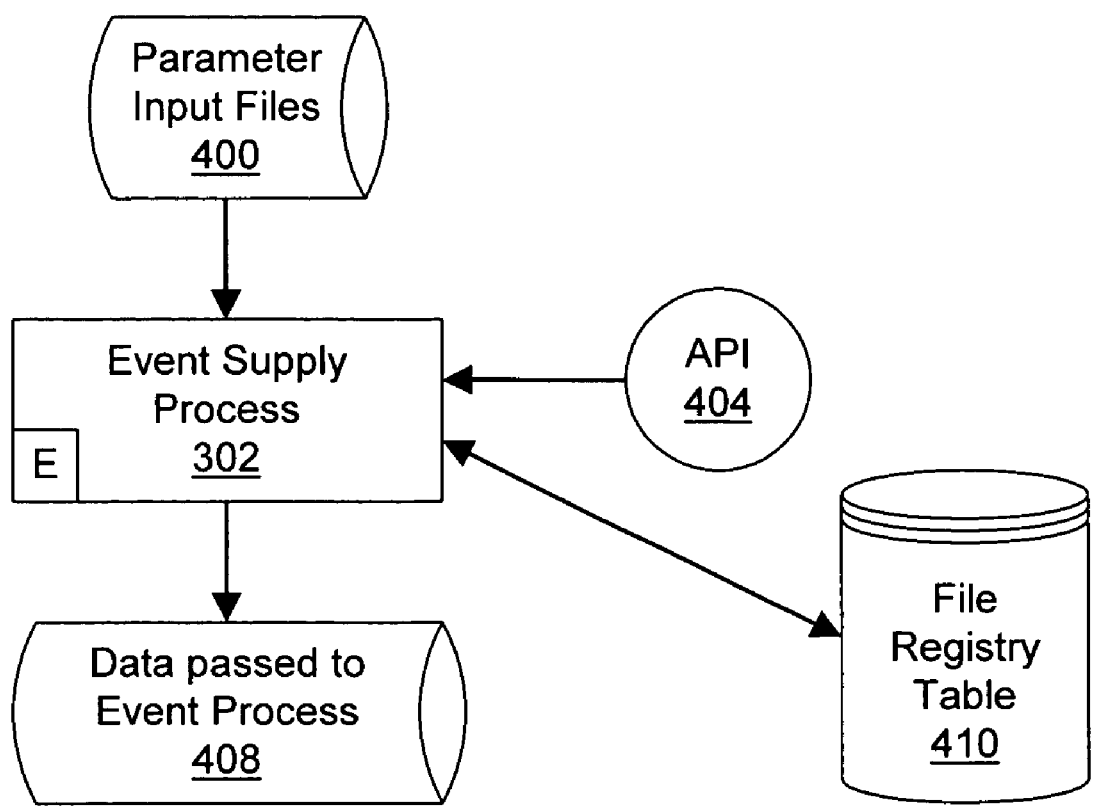
FIG. 4 is a block diagram illustrating an overview of the event supply process according to one embodiment.

FIG. 4: Event Supply Process

FIG. 4 is a block diagram illustrating the event supply process according to one embodiment. The event supply process 302 accesses the file registry table 410 using parameter input 400 to verify that a requested file has been registered. The file registry table 410 contains descriptions of files needed for processing. Files may store events, transactions, and other data related to transaction processing. The file registry table may contain, for each file, a file name, a system identification number, a file type (e.g., a database type such as VSAM, sequential, or DB2), and an application programming interface (API) which names the module that reads the file to create events.

Parameter input 400 may include information relating to a requested file. A match is the condition that the requested file exists on the file registry table 410. If a match is not found, error processing may begin. Error processing is indicated in the Figures by an [E] in a lower corner of a block diagram box to indicate that, in one embodiment, the system for event-triggered transaction processing has centralized error processing for records and events that fail. When an error is encountered, the system for event-triggered transaction processing analyzes it to determine the severity of the error. The error is then recorded in the error log, and the system for event-triggered transaction processing responds according to the severity of the error. If the error is a warning, processing can continue, and the warning message indicates which record had the problem. For a more severe error, processing stops, and an error message provides an explanation. If the error is fatal, the system for event-triggered transaction processing abends (e.g., shuts down).

If a match is found on the file registry table 410, the file type and application programming interface (API) for the file are retrieved from the file registry table 410. Next, the event supply process 302 opens and reads records from the file. For each record, the API 404 is called. In one embodiment, the event supply process 302 passes the data record along with an instruction to build the event to the API 404. The API 404 discards any unwanted records and returns an event string 408 to be passed to the event process 306.

Figure 5:
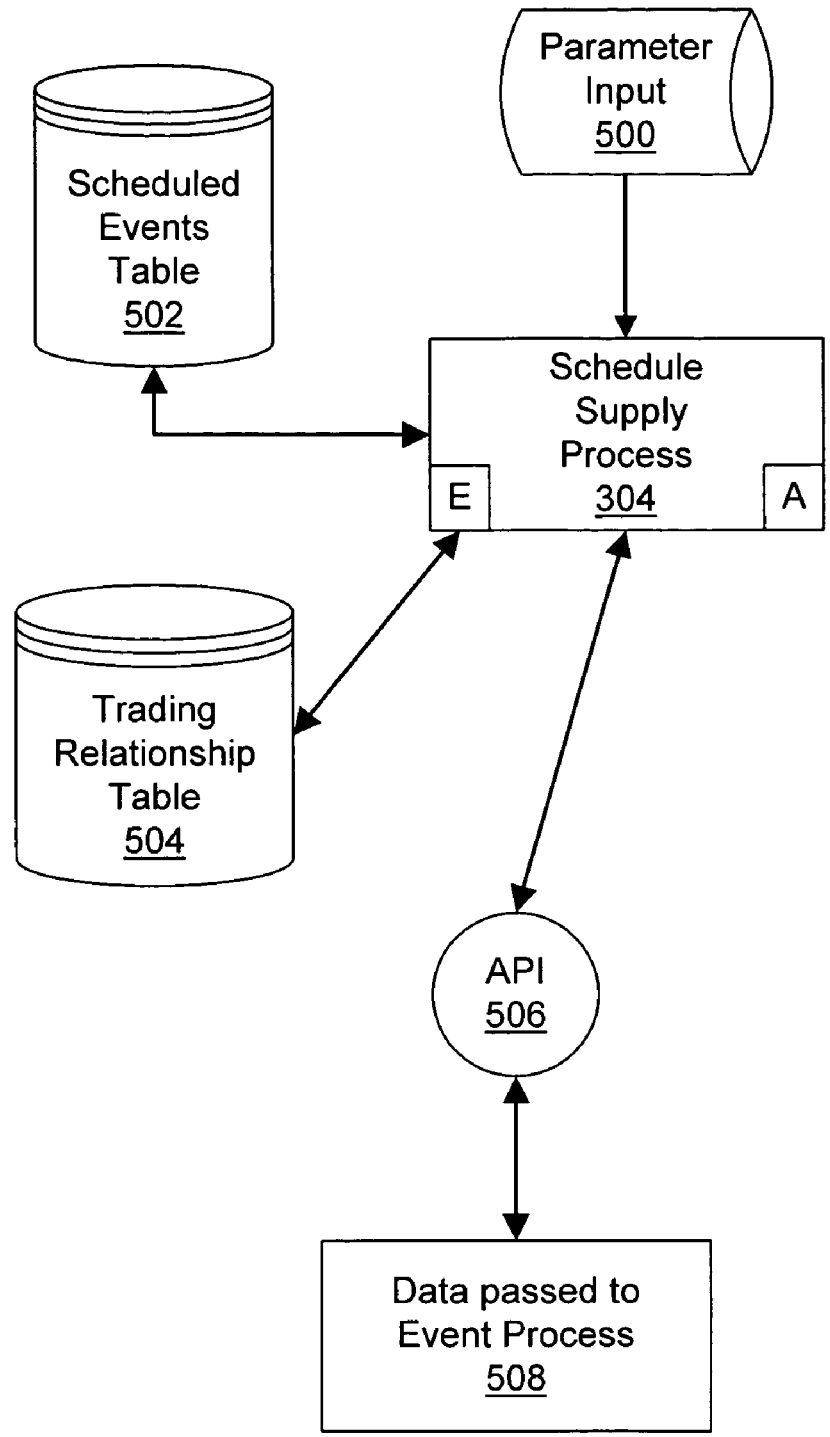
FIG. 5 is a block diagram illustrating an overview of the schedule supply process according to one embodiment.

FIG. 5: Schedule Supply Process

FIG. 5 is a block diagram illustrating the schedule supply process according to one embodiment. In one embodiment, the schedule supply process 304 accesses the scheduled events table 502 using parameters 500 to determine the events to be processed. The scheduled events table 502 identifies the business events that will be created by the schedule supply process. The scheduled events table 502 may contain information relating to schedules for events. Schedules for events may include a sending trading partner identifier such as an identification number to identify a sending trading partner, an administration system identifier such as an identification number, an output event identifier such as a name, an input event identifier such as a name, a date and/or time the event is scheduled to be processed, an event frequency (e.g., daily, weekly, or monthly), an event frequency increment, a current/all indicator, a status (e.g., active or suspended), and an application programming interface which names the module that reads the file to create events. The event frequency increment specifies a frequency at which the event should be run in event frequency units. For example, to schedule an event every other week, the event frequency should be set to "weekly," and the event frequency increment should be set to "2." The current/all indicator identifies whether all schedules for a given event should be run or only the current schedule should be run.

The trading relationship table 504 is accessed to determine if active trading partner relationships exist for the scheduled events records that have been found. The trading relationship table 504 stores data related to trading relationships. As used herein, a "trading relationship" includes a relationship between one or more sending trading partners and one or more receiving trading partners. A trading relationship may also include the status of the relationship (e.g., active, inactive, or suspended), information related to the event being sent from the sending trading partner to the receiving trading partner, a trading partner identifier such as an identification number for a sending trading partner, a trading partner identifier such as an identification number for a receiving trading partner, an output event identifier such as an output event name, a destination for the event, an event frequency (e.g., daily, weekly, or monthly), a trading relationship status (e.g., active, inactive, or suspended), and an indicator (e.g., test or production).

For each record (i.e., event) with an active trading partner relationship in the trading relationship table 504, an application programming interface (API) 506 to an appropriate administration system is retrieved from the scheduled events table 502. When API 506 is called, it returns an event string 508 to be passed to the event process. Based on the type of scheduled event or transaction, the API 506 may be used in different ways. For an annuity asset pricing (AAP) transaction, for example, the API 506 may be used to access a fund information file for processing each record (i.e., fund) that is active. The API 506 may also be used to access the unit value history field to obtain find values for AAP transactions. For a positions and valuations focused refreshed (PFF) transaction or a positions and valuations full refresh (PVF) transaction, the API 506 may be used to access a policy hierarchy record using a receiving trading partner identifier from the trading relationship table 504 as an agent identifier. For PFF and PVF transactions, the API 506 may also be used to access a policy commission record for each policy fund. In one embodiment, the API 506 is used to read, extract, or otherwise obtain additional information from an administration system according to a map and/or business rules and/or search criteria, as discussed in greater detail below with reference to the mapping process 316.

The records retrieved from the scheduled events table 502 are updated based on frequency and increment to the next scheduled date. If multiple records are found on the scheduled events table 502, each one is examined separately until all records are processed. The schedule supply process 304 may also include both error processing and activity log/tracking (indicated in the Figures by an [A] in a lower corner of a block diagram box). In one embodiment, the scheduled events table 502 is scanned daily, and an error message is generated if no records (i.e., events) are found on a given day. In activity log/tracking, the system for event-triggered transaction processing logs the start of a process, the in-progress stage of the process, and the completion of the process. For balancing and verification purposes, the following totals may be provided by activity log/tracking: number of records input, number of records discarded, number of errors, and number of events created.

Figure 6:
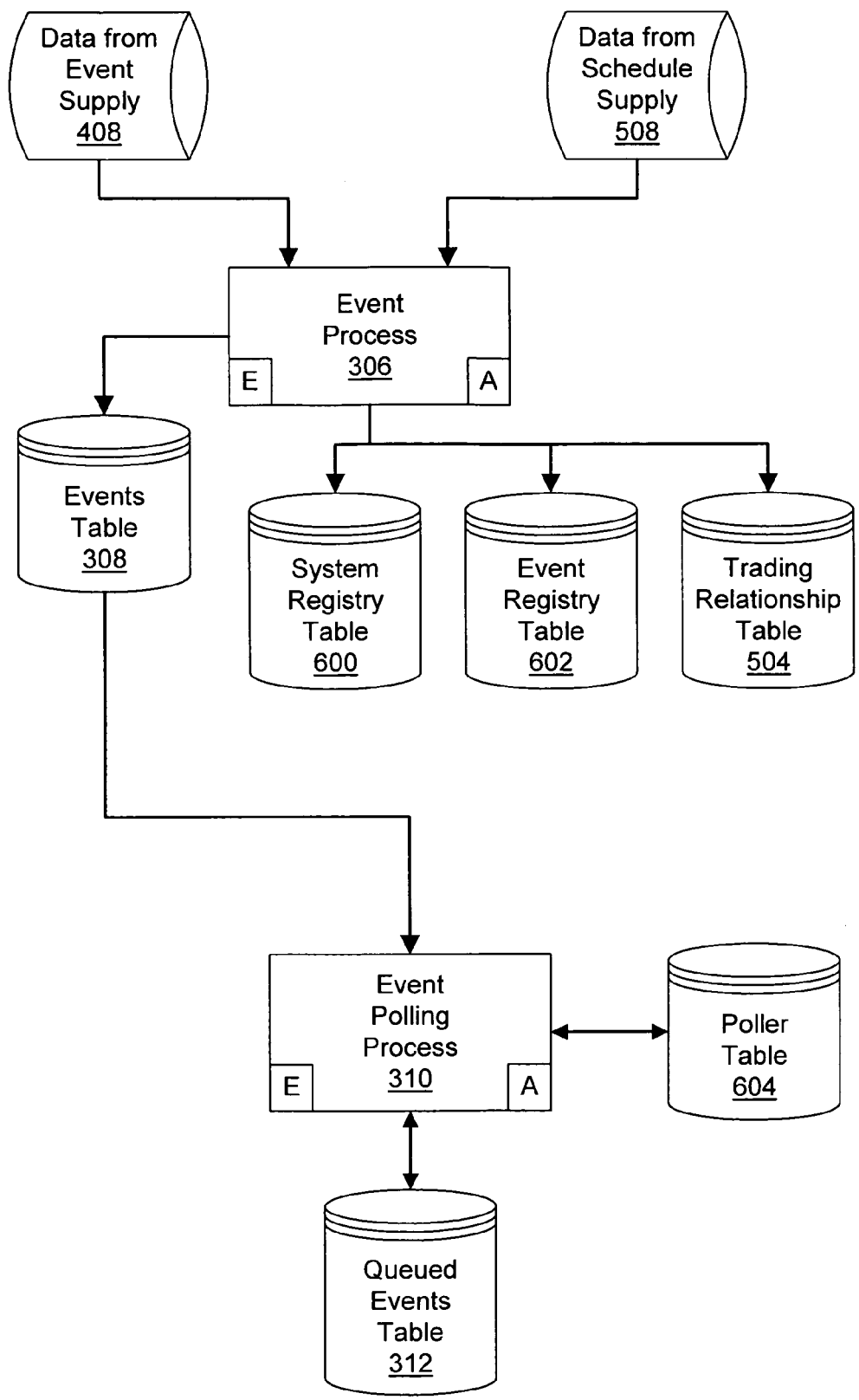
FIG. 6 is a block diagram illustrating an overview of the event process and the event polling process according to one embodiment.

FIG. 6: Event and Event Polling Processes

FIG. 6 is a block diagram illustrating the event process 306 and the event polling process 310 according to one embodiment. Both of these processes may have error processing and activity log/tracking, as described with reference to FIGS. 4 and 5, respectively. In one embodiment, the event process 306 validates the transmitting administration system by comparing the system identification number on the incoming data 408 from the event supply process and the incoming data from the schedule supply process 508 to the system registry table 600. The system registry table 600 contains information regarding the transmitting administration system of the sending trading partner. The system registry table 600 may contain identifiers such as an identification number and name for each transmitting administration system. If the administration system is one that will be accessed to obtain additional data to complete a transaction, the system registry table 600 may also contain an application program interface which identifies the module that accesses the administration system, as discussed with reference to FIG. 5.

In one embodiment, the event process 306 creates events and updates the events table 308. An event corresponds to one or more actions required to process a transaction. The events table 308 contains created events. The events table 308 may contain a record for each event, wherein the record may include a sending trading partner identifier such as an identification number, an administration system identifier such as an identification number, a receiving trading partner identifier such as an identification number, an input event identifier such as an name, an output event identifier such as an name, and an event timestamp. The events table 308 may also contain data specific to a type of transaction. For example, a record for an PFF or PVF transaction in the events table 308 may include a company code, a policy number, a plan code, and an agent ID. A record for an AAP transaction may include a company code, a fund number, a fund type, and a fund value.

The event process 306 may validate the events by accessing the event registry table 602. The event registry table 602 contains information about the sending trading partner and administration system identifiers for a particular event. The event process 306 may also validate that the trading relationship table 504 contains an active record for the pair of partners in question.

In one embodiment, the event polling process 310 accesses the poller table 604 to determine which events require further processing, selects the appropriate events from the events table 308, and enters these events on the queued events table 312 with a status of "queued." The poller table 604 establishes the selection criteria to identify the events that should be queued for output. The poller table 604 may contain a poller identifier such as an identification number, a queue identifier such as an identification number, a sending trading partner identifier such as an identification number, a receiving trading partner identifier such as an identification number, an administration system identifier such as an identification number, an output event identifier such as a name, and an event status. The queued events table 312 may contain a queue identifier such as an identification number, a sending trading partner identifier such as an identification number, an administration system identifier such as an identification number, a receiving trading partner identifier such as an identification number, an input event identifier such as a name, an output event identifier such as a name, and an event status.

Figure 7:
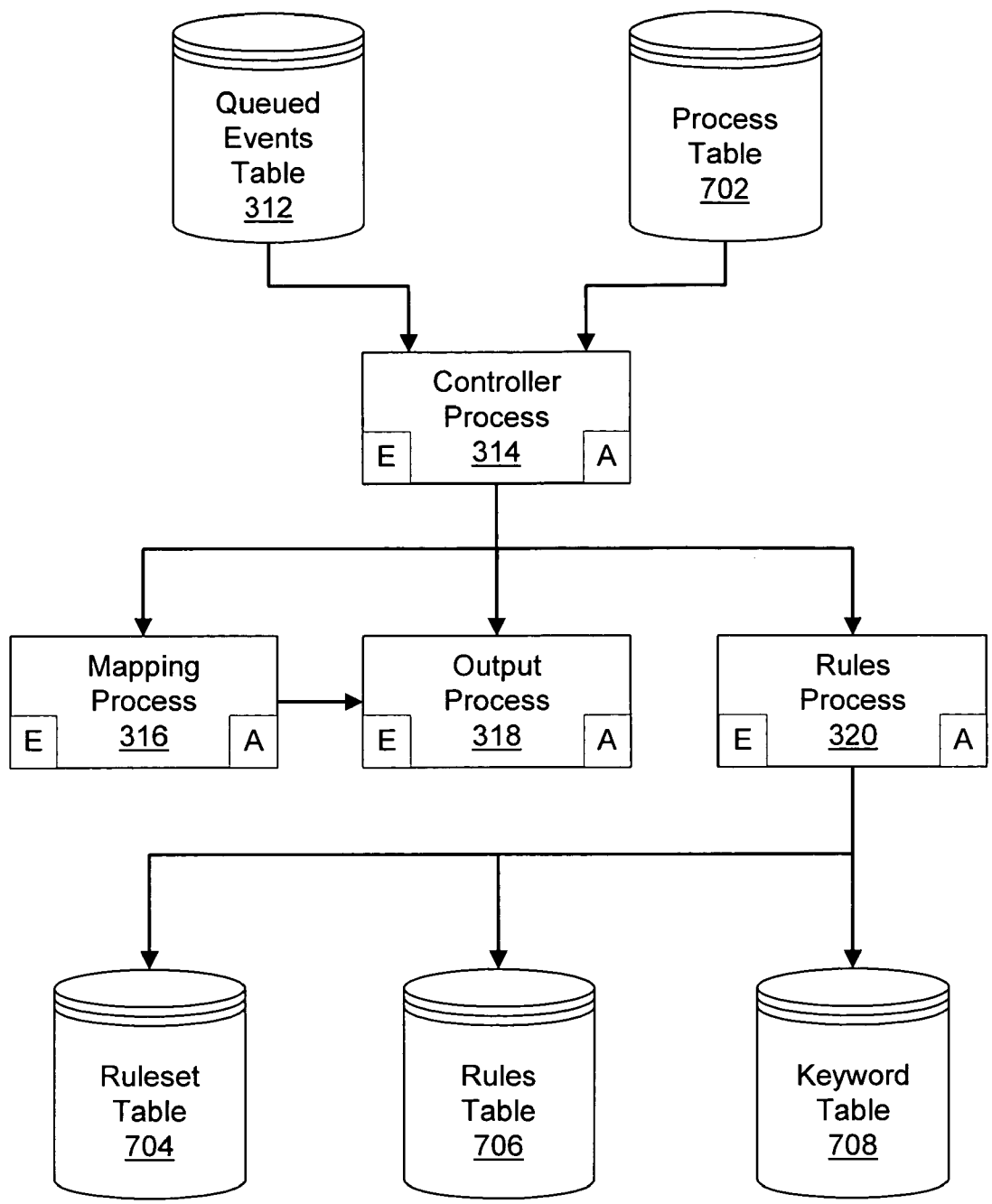
FIG. 7 is a block diagram illustrating an overview of the controller process and the rules process according to one embodiment.

FIG. 7: Controller and Rules Processes

FIG. 7 is a block diagram illustrating the controller process 314 and the rules process 320 according to one embodiment. Both of these processes may have error processing and activity log/tracking, as described with reference to FIGS. 4 and 5, respectively. In one embodiment, the controller process 314 verifies that a mapset and a ruleset for a particular event exist on the process table 702. The process table 702 contains the sending trading partner and receiving trading partner identifiers such as identification numbers, input and output event identifiers such as names, application program interfaces, and the mapset and ruleset to complete mapping and rules processing. A mapset and ruleset may be used to generate an outgoing transaction. A mapset is a collection of one or more maps. A map is a relationship between one or more source administration systems and one or more destination administration systems. A ruleset is a collection of one or more business rules. As used herein, a "business rule" is one or more terms requiring that specified conditions or criteria be met in retrieving additional data from an administration system. Maps and business rules are discussed in greater detail below.

The controller process 314 may call the rules process 320 to apply any business rules that have been assigned. The rules process 320 obtains the rules from the ruleset table 704 and determines if each rule is true or false with respect to each of any number of records of additional data retrieved from an administration system. The ruleset table 704 contains one or more rules associated with a ruleset. The details of each rule may be found in the rules table 706. An individual rule may contain one or more keywords designed to retrieve the appropriate additional data to complete a transaction. The details of each keyword may be found in the keyword table 708. If a rule is found to be true by the rules process 320, processing can continue. If a rule is found to be false by the rules process 320, the appropriate record is bypassed.

The controller process 314 calls the mapping process 316 to apply the mapping instructions from the mapset. The mapping process 316 is discussed in greater detail with respect to FIG. 8. The controller process 314 may also determine the output administration system to which the event will be sent. The controller process calls the output process 318 to create the output files, wherein the output files include outgoing transactions.

Figure 8:
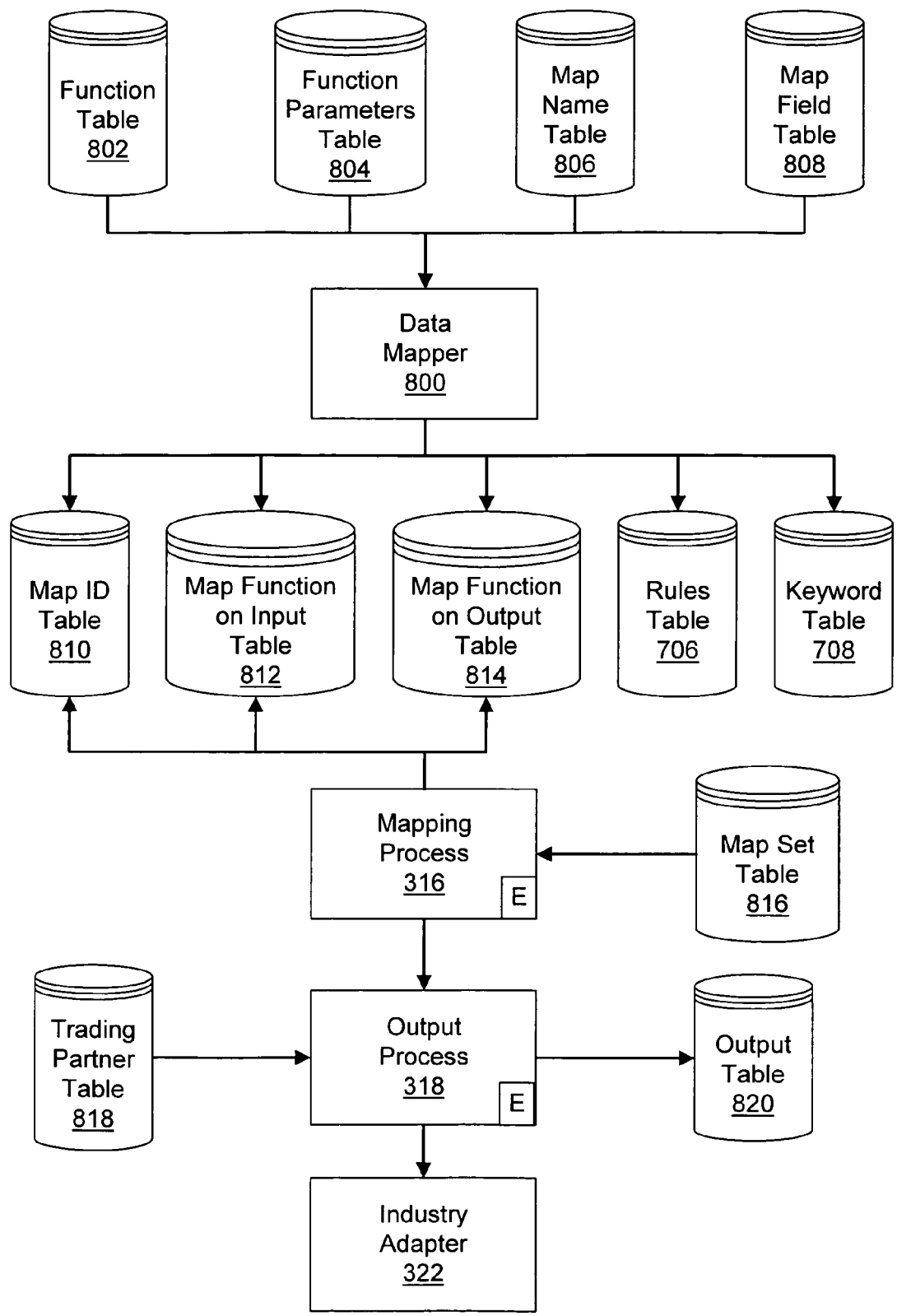
FIG. 8 is a block diagram illustrating an overview of the mapping process and the output process according to one embodiment.

FIG. 8: Mapping and Output Processes

FIG. 8 is a block diagram illustrating the mapping process 316 and the output process 318 according to one embodiment. Both of these processes may have error processing and activity log/tracking, as described with reference to FIGS. 4 and 5, respectively. A data mapper 800 is a software application which permits a user to define one or more maps or mapsets for use by the mapping process 316. In one embodiment, the data mapper 800 displays source and destination record fields and permits a user to establish a connection from one or more fields in the source record to a field in the destination record. In this way, the user may define a map which determines the source of additional data to be obtained from an administration system to generate an outgoing transaction. In order to display the source and destination record fields, a map name, a source administration system, a file name for the source administration system, a destination administration system, and a file name for the destination administration system must be chosen in one embodiment.

The data mapper 800 may include a graphical user interface (GUI). With a GUI according to one embodiment, source fields may be selected to create a source selection. The source selection may then be dragged and dropped onto a destination field. Additionally, functions may be applied to transform or convert either the source or the destination fields. If functions are not applied, and more than one source field is mapped to a destination field, then by default the value of the destination field is the sum of the values of the mapped source fields.

Business rules may also be defined and built in the data mapper application 800. In one embodiments, the business rules may include combinations of keywords and/or logical operators. Keywords may include terms such as sending trading partner identifiers, receiving trading partner identifiers, administration system identifiers, transaction identifiers, and transaction statuses. Logical operators may include "AND", "OR", "NOT", "EQUALS", "NOT EQUAL TO", "GREATER THAN", and "LESS THAN". The business rule may include a string of at least one keyword and at least one logical operator which is constructed by a user of the computer system. The business rule may then be entered into the computer system by a user via a user interface and subsequently stored in a database. In one embodiment, the business rule, once constructed, is entered much like one would enter a search string into a search engine. The business rules may therefore function as search criteria for additional information to be obtained to complete a transaction. The business rules may use or reuse existing rules, keywords, and/or functions to build new rules or functions for obtaining the additional data and completing transactions. By allowing a user to construct and enter different business rules which are subsequently used to generate different outgoing transactions, the system and method for event-triggered transaction processing is adjustable to process an indefinite number of types of transactions without the intervention of a programmer writing specialized programs.

The data mapper 800 may access the following mapping-related tables: function table 802, function parameters table 804, map name table 806, map field table 808, map ID table 810, map function on input table 812, map function on output table 814, rules table 706, and keyword table 708. The function table 802 may contain functions that can be applied to a field. The function parameters table 804 may contain a list of parameters associated with the functions. The map name table 806 may contain a list of available maps. The map field table 808 may define all the fields in a map. The map ID table 810 may define how the fields are mapped from the input (source) to the output (destination). The map function on input table 812 may define a function applied to an input field. The map function on output table 814 may define a function applied to an output field. The keyword table 708 may contain the keywords used in the mapping process.

After maps and rules have been defined and built using the data mapper 800, the mapping process 316 may execute those maps and rules. The mapping process 316 applies one or more business rules to retrieve additional data from an administration system specified in a map. To determine how to generate the outgoing transaction, the mapping process 316 may access the following mapping tables: mapset table 816, map ID table 810, map function on input table 812, and map function on output table 814. The mapset table 816 may contain one or more mapsets. In one embodiment, the input data is obtained from the source administration system; functions are applied, if appropriate; and the data is mapped to the output table 820 via the output process 318. The output table 820 may contain the outgoing record (i.e., the outgoing transaction) as well as information on the sending and receiving trading partners, the type of record, and date and time the record was processed.

The output process 318 may provide a central storage area for all processed transactions. In one embodiment, records are stored in a common format and remain in this storage area until being translated by an appropriate industry adapter 322. The output process 318 receives output data from the mapping process 316. For each output record received, the output process 318 may then call the trading partner table 818 to obtain identifying information. The trading partner table 818 may contain identifiers such as the names and identification numbers of the sending and receiving trading partners. The output process 318 then builds an information header for each record and writes the record to the output table 820 with a status of "new." After each outgoing transaction is processed by an industry adapter 322, the output process 318 changes the status of the corresponding record in the output table 820 to "complete."

The industry adapter 322 may determine which records should be in a test file and which records should be in a production file. In one embodiment, the industry adapter 322 may attach headers and/or trailers required by the NSCC to outgoing transactions. In one embodiment, AAP records are sent to the NSCC, which passes the appropriate information to each of the company's trading partners listed on a trading partner profile maintained at NSCC.

Figure 9:
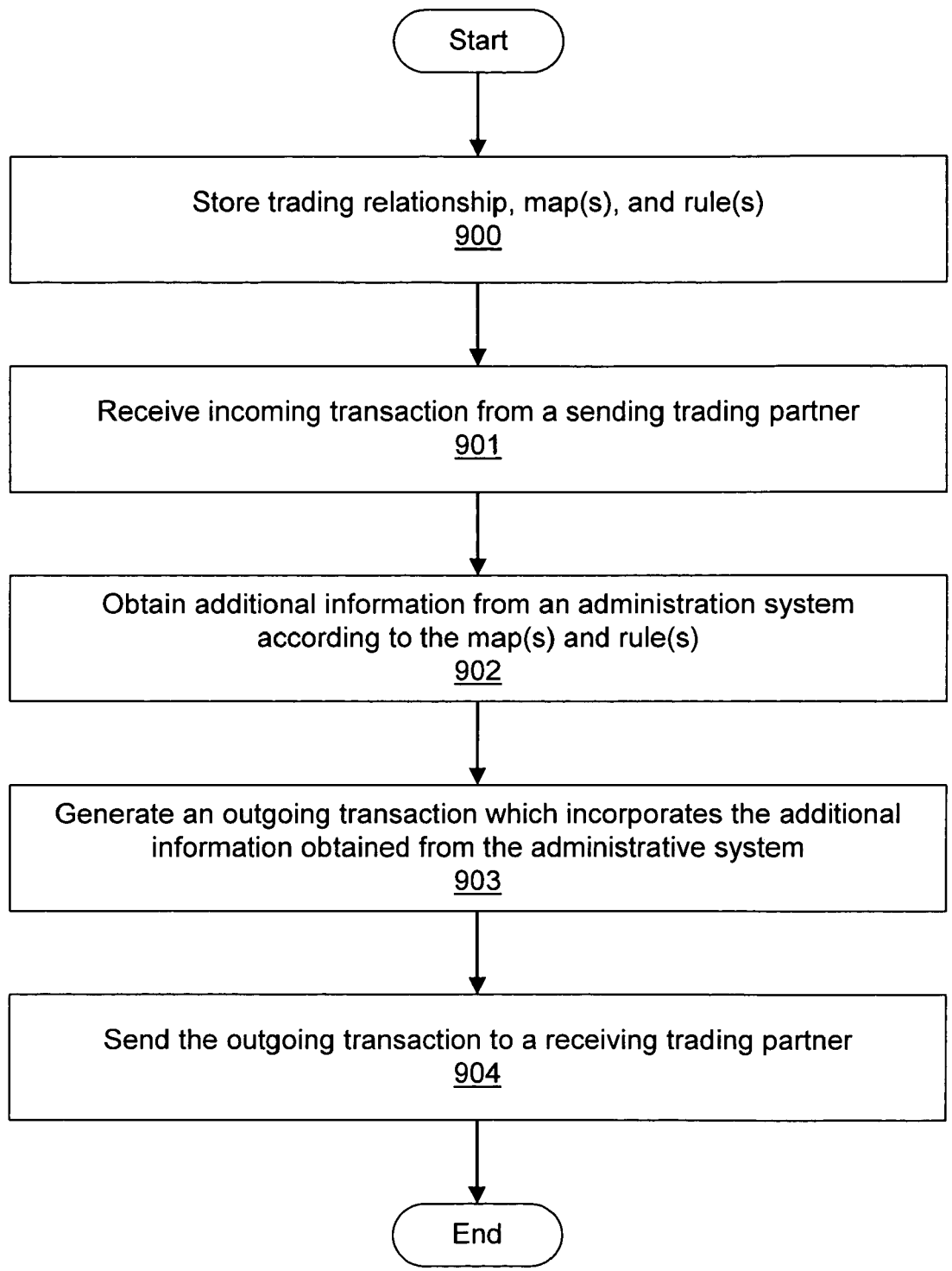
FIG. 9 is a flowchart illustrating an overview of event-triggered transaction processing according to one embodiment.

FIG. 9: An Overview of Event-Triggered Transaction Processing

FIG. 9 is a flowchart of an embodiment of a system and method for event-triggered transaction processing. In step 900, a trading relationship between trading partners is stored in a trading relationship database. Trading partners may include agents, banks, insurance companies, broker/dealers, and other suitable entities. In the insurance field, for example, trading partners may include insurance companies, insurance agents, and insurance broker/dealers. At least one trading partner is a sending trading partner and at least one trading partner is a receiving trading partner with respect to a transaction between the at least one sending trading partner and the at least one receiving trading partner. In step 900, maps and business rules may also be defined and stored with regard to particular types of transactions and particular trading partners. In one embodiment, the maps and rules are created with a drag-and-drop mapping of incoming transactions to outgoing transactions in a graphical user interface, as discussed with reference to the data mapper application 800 in FIG. 8.

In step 901, an incoming transaction is received from the at least one sending partner as identified in a trading relationship. In one embodiment, the incoming transaction may be received through an industry clearinghouse such as the Annuity Processing Service of the NSCC. The receiving of incoming transactions may take place at a predetermined time according to a schedule. The schedule may include a particular time and date or a frequency.

In step 902, in response to receiving the incoming transaction from the at least one sending trading partner, additional information is read, obtained, or otherwise extracted from an administration system in order to complete the processing of the transaction. One or more maps may determine the source of the additional data to be obtained. One or more business rules may be executed against records in the administration system to specify particular output from the administration system. In one embodiment, the additional data may be obtained from more than one administration system. The administration system may be an in-house administration system such as an annuity administration system. In one embodiment, the administration system is the VANTAGE-ONE annuity administration system available from Computer Sciences Corporation. Additional information may be obtained at a predetermined time according to a schedule. The schedule may include a particular time and date or a frequency. The incoming transaction may therefore include a triggering event which prompts the obtaining of additional data.

In step 903, an outgoing transaction is generated in response to obtaining additional information from an administration system. The outgoing transaction may include the additional data obtained from the administration system. In step 904, the outgoing transaction is sent to the at least one receiving trading partner. The sending of outgoing transactions may take place at a predetermined time according to a schedule which may specify a date and time or a frequency at which outgoing transactions are to be sent. The outgoing transaction may be queued along with other outgoing transactions for sending at a later time. The outgoing transaction may be reformatted into an industry standard data format by an adapter. In one embodiment, the outgoing transaction may be sent through the Annuity Processing Service of the NSCC, and the outgoing transaction may be reformatted into an NSCC-standard data format.

Figure 10:
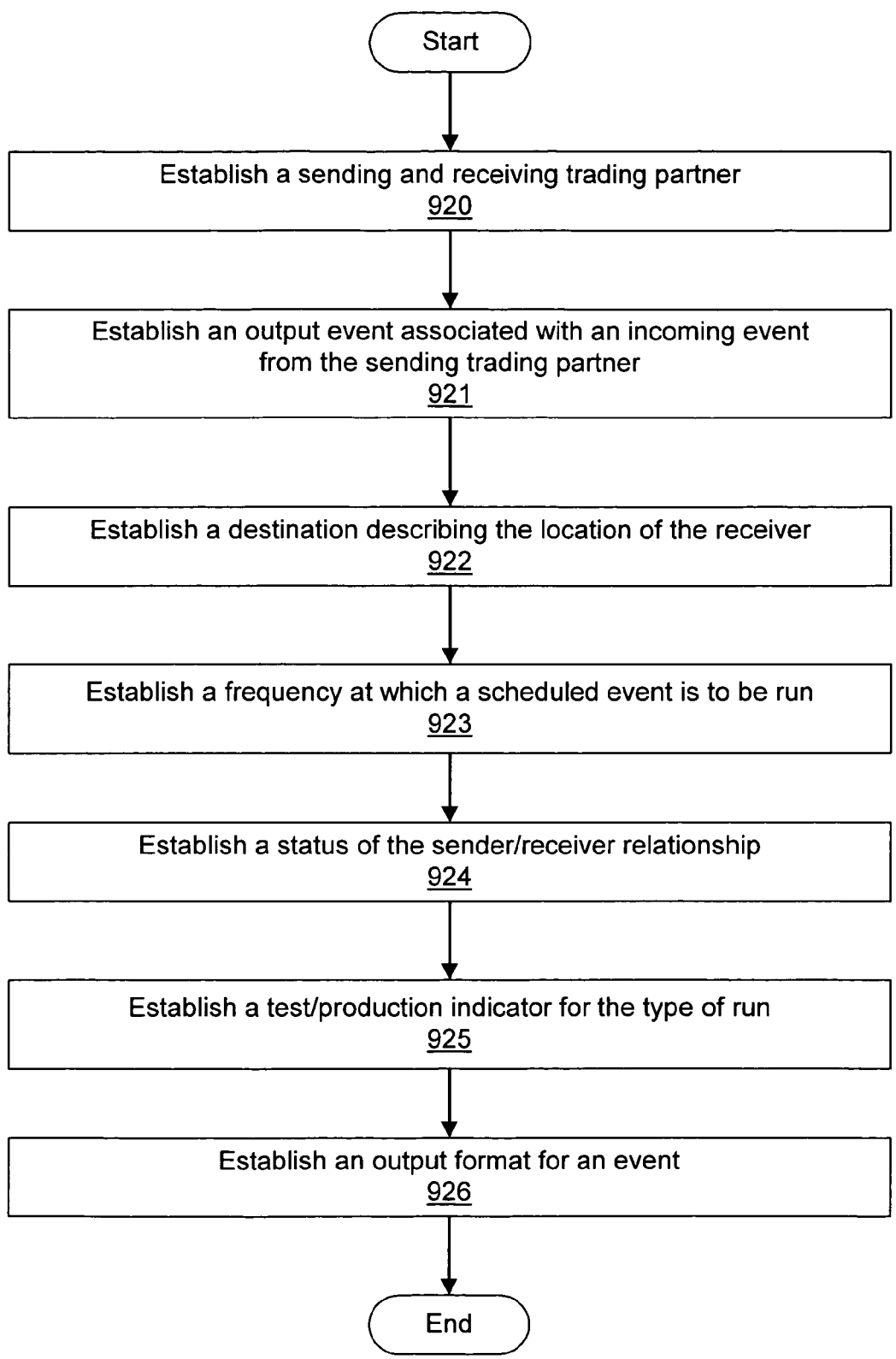
FIG. 10 is a flowchart illustrating the storing of a trading relationship according to one embodiment.

FIG. 10: Storing a Trading Relationship

FIG. 10 shows steps that may further illustrate storing a trading relationship between trading partners, as shown by step 900 in FIG. 9, according to one embodiment. The steps shown in FIG. 10 may be performed in any order, in various embodiments, including simultaneously. In step 920, at least one trading partner is defined as a sender and at least one trading partner is defined as a receiver. In step 921, an output event or transaction is created which is associated with an incoming event from the sending trading partner. In step 922, a destination describing the location of the receiving trading partner is established. In step 923, an event frequency describing the frequency at which a scheduled event is to be run is established. In step 924, a status indicator, describing the condition of the relationship between the sending trading partner and the sending trading partner as it relates to the destination, is established. In step 925, a test/production indicator, describing the type of run of the transaction processing, is established. In step 926, an output format is established for an event.

Figure 11:
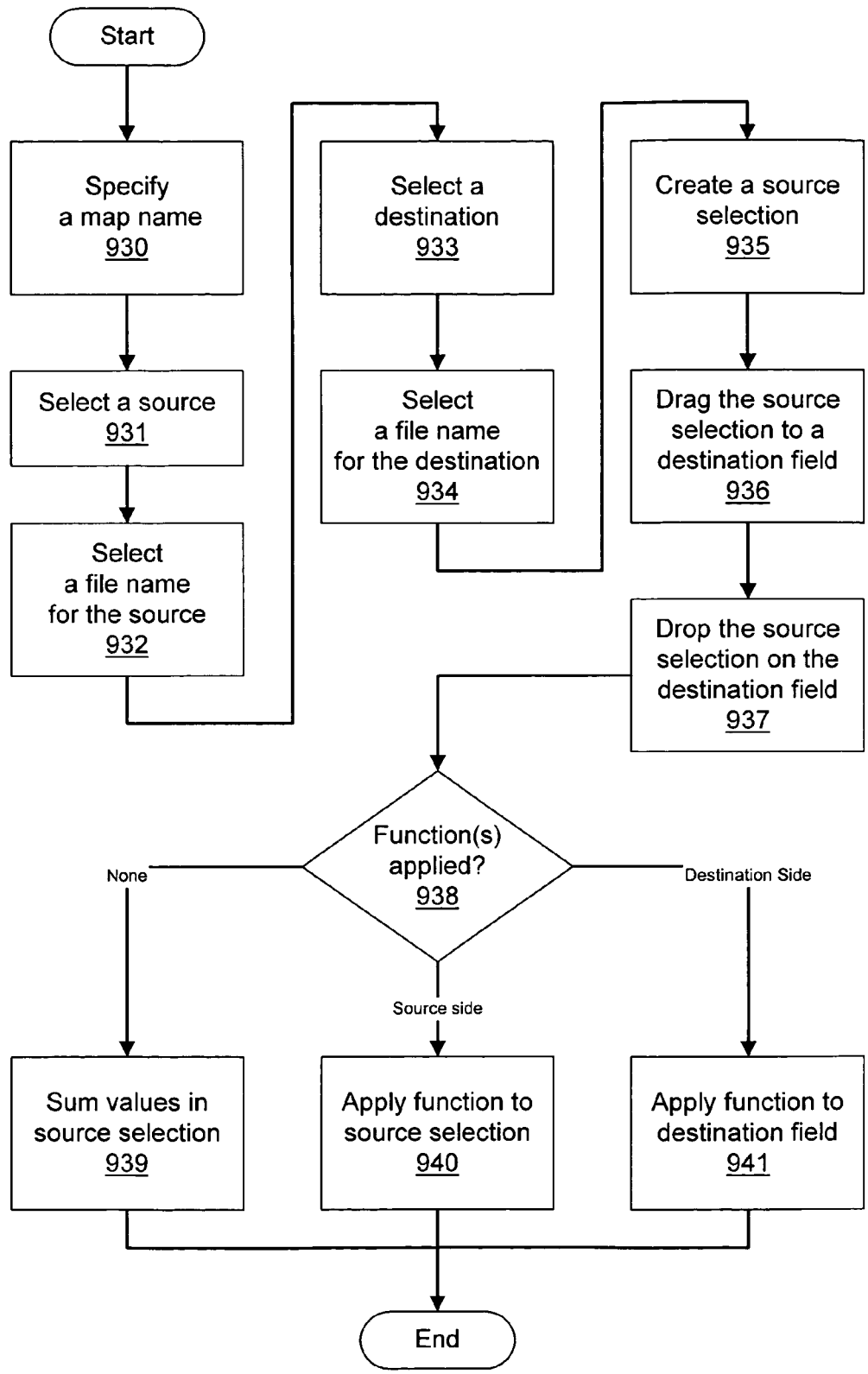
FIG. 11 is a flowchart illustrating the storing of a map according to one embodiment.

FIG. 11: Storing a Map

FIG. 11 shows steps that may further illustrate storing a map, as shown by step 900 in FIG. 9, according to one embodiment. In various embodiments, the steps shown in FIG. 11 may be performed in a different order than the order shown in FIG. 11. For example, steps 930 through 934 may be performed in any order, including simultaneously. In step 930, a map name is specified. In step 931, a source administration system is selected. In step 932, an associated source file name is selected. In step 933, a destination administration system is selected. In step 934, an associated destination file name is selected. In step 935, a source selection, which is a selection of one or more source fields, is created through user interaction with a graphical user interface (GUI). In step 936, the source selection is dragged to a destination field through the GUI. In step 937, the source selection is dropped on the destination field through the GUI.

The value of the destination field may be determined by the existence of a function. In step 938, it is determined whether a function should be applied and/or what type of function should be applied. In step 939, no function is applied and the value of the destination field is determined to be the sum of the values of the selected source fields. In step 940, a source-side function is applied to one or more of the source fields in the source selection, and the value of the destination field is determined to be the resulting value of the sum of the values of the selected source fields after application of the source-side function. In step 941, a destination-side function is applied to one or more of the destination fields, and the value of the destination field is determined to be the resulting value of first summing the values of the selected source fields and then applying the destination side function.

Various embodiments further include receiving or storing instructions and/or data implemented in accordance with the foregoing description upon a carrier medium. Suitable carrier media include storage media or memory media such as magnetic or optical media, e.g., disk or CD-ROM, as well as signals such as electrical, electromagnetic, or digital signals, conveyed via a communication medium such as networks 102 and/or 104 and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for processing transactions, wherein the transactions comprise one or more information fields, comprising:

obtaining an administrative system, wherein the administrative system is configured to receive incoming transactions from one or more sending trading partners, add additional information to the incoming transactions and send the modified transactions to one or more receiving trading partners;

generating a map for the administrative system, wherein generating the map comprises:

selecting one or more source fields from the administrative system, wherein each source field corresponds to a source for the additional information;

associating a destination field with the one or more selected source fields, wherein each destination field corresponds to an information field of an incoming transaction to which additional information can be added;

determining whether to apply one or more source-side functions to the one or more source fields; and, if a source-side function is applied to the one or more source fields, associating one or more source-side functions with the one or more selected source fields, wherein the source-side functions modify the additional information added to the destination field from the one or more selected source fields; wherein the value of each destination field is the resulting value of the sum of the values of the selected source fields after application of the source-side function; and determining whether to apply a destination-side function to one or more of the destination fields; and, if a destination-side function is applied to the destination fields, associating one or more destination-side functions with the one or more of the selected destination fields, wherein the destination-side functions modify the additional information added to the destination field from the associated source fields, wherein the value of the destination field is the resulting value of first summing the values of the associated source fields and then applying the destination-side function;

receiving at least one incoming transaction from at least one sending trading partner;

automatically applying one or more business rules to the at least one incoming transaction to identify one or more source fields of the administration system that contain information to be added to one or more information fields of the at least one incoming transaction;

automatically reading the identified additional information from one or more source fields of the administration system in response to receiving at least one incoming transaction from the at least one sending trading partner;

automatically modifying the additional information read from the source fields using one or more of the source-side functions or one or more of the destination-side functions;

automatically selecting one or more destination fields using pathways established in the generated map;

automatically adding the modified additional information to the one or more selected destination fields;

automatically generating at least one outgoing transaction, wherein the at least one outgoing transaction comprises data from the incoming transaction and the modified additional information read from one or more source fields of the administration system;

automatically translating at least one outgoing transaction into a computer data format decipherable by a receiving trading partner transaction processing software; and automatically sending at least one outgoing transaction to at least one receiving trading partner.

2. The method of claim 1, wherein at least one business rule comprises one or more keywords.

3. The method of claim 1, wherein at least one of the business rules comprises one or more logical operators.

4. The method of claim 1, wherein at least one of the business rules comprises a string of at least one keyword and at least one operator, and wherein at least one of the business rules is entered into a computer system by a user via a user interface.

5. The method of claim 1, wherein at least one business rule comprises search criteria.

6. The method of claim 5, wherein the search criteria comprise one or more keywords.

7. The method of claim 1, further comprising: queuing at least one outgoing transaction in response to generating at least one outgoing transaction.

8. The method of claim 1, wherein sending at least one outgoing transaction to at least one receiving trading partner further comprises sending at least one outgoing transaction to at least one receiving trading partner through an industry clearinghouse system.

9. The method of claim 1, wherein at least one incoming transaction is an insurance-related transaction.

10. The method of claim 1, wherein at least one business rule comprises a receiving trading partner identifier.

11. The method of claim 1, wherein at least one business rule comprises an administration system identifier.

12. The method of claim 1, wherein at least one business rule comprises a transaction identifier.

13. The method of claim 1, wherein at least one business rule comprises a transaction status.

14. The method of claim 1, wherein at least one business rule comprises a sending trading partner identifier.

15. The method of claim 1, wherein at least one business rule is entered into a database.

16. The method of claim 1, wherein the computer data format is National Securities Clearing Corporation (NSCC)-standard data format.

17. A system comprising:
a CPU;
a database coupled to the CPU;
an administration system coupled to the CPU, wherein the administrative system is configured to receive incoming transactions from one or more sending trading partners, add additional information to the incoming transactions and send the modified transactions to one or more receiving trading partners; and
a memory coupled to the CPU, wherein the memory stores one or more computer programs executable by the CPU; wherein the computer programs are executable to:
store a trading relationship between trading partners of a transaction, wherein the trading relationship is stored in the database, wherein at least one trading partner is a sending trading partner and at least one trading partner is a receiving trading partner;
generate a map for the administrative system, wherein generating the map comprises:
selecting one or more source fields from the administrative system, wherein each source field corresponds to a source for the additional information;
associating a destination field with the one or more selected source fields, wherein each destination field corresponds to an information field of an incoming transaction to which additional information can be added;
determining whether to apply one or more source-side functions to the one or more source fields; and, if a source-side function is applied to the one or more source fields, associating one or more source-side functions with the one or more selected source fields, wherein the source-side functions modify the additional information added to the destination field from the one or more selected source fields; wherein the value of each destination field is the resulting value of the sum of the values of the selected source fields after application of the source-side function; and
determining whether to apply a destination-side function to one or more of the destination fields; and, if a destination-side function is applied to the destination fields, associating one or more destination-side functions with the one or more of the selected destination fields, wherein the destination-side functions modify the additional information added to the destination field from the associated source fields wherein the value of the destination field is the resulting value of first summing the values of the associated source fields and then applying the destination-side function;

receive at least one incoming transaction from the at least one sending trading partner;
automatically apply one or more business rules to the at least one incoming transaction to identify one or more source fields of the administration system that contain information to be added to one or more information fields of the at least one incoming transaction;
automatically read the identified additional information from the one or more source fields of the administration system in response to receiving at least one incoming transaction from at least one sending trading partner, wherein the additional information is identified by at least one business rule;
automatically modify the additional information read from the source fields using one or more of the source-side functions or one or more of the destination-side functions;
automatically select one or more destination fields using pathways established in the generated map;
automatically add the modified additional information to the one or more selected destination fields;
automatically generate at least one outgoing transaction, wherein the at least one outgoing transaction comprises data from the incoming transaction and the modified additional information read from one or more source fields of the administrative system;
automatically translate at least one outgoing transaction into a computer data format decipherable by a receiving trading partner transaction processing software; and
automatically send at least one outgoing transaction to the at least one receiving trading partner, wherein at least one receiving trading partner is identified in the trading relationship.

18. The system of claim 17, wherein at least one business rule comprises a string of at least one keyword and at least one operator, and wherein at least one business rule is entered into a computer system by a user via a user interface.

19. The system of claim 17, wherein at least one business rule is defined by a user through a user interface.

20. The system of claim 17, wherein at least one incoming transaction is an insurance-related transaction.

21. A carrier medium, which stores program instructions, wherein the program instructions are executable by a computer system to implement the method of:
obtaining an administrative system, wherein the administrative system is configured to receive incoming transactions from one or more sending trading partners, add additional information to the incoming transactions and send the modified transactions to one or more receiving trading partners, wherein the transactions comprise one or more information fields;
generating a map for the administrative system, wherein generating the map comprises:
selecting one or more source fields from the administrative system, wherein each source field corresponds to a source for the additional information;
associating a destination field with the one or more selected source fields, wherein each destination field corresponds to an information field of an incoming transaction to which additional information can be added;
determining whether to apply one or more source-side functions to the one or more source fields; and, if a source-side function is applied to the one or more source fields, associating one or more source-side functions with the one or more selected source fields, wherein the source-side functions modify the additional information added to the destination field from the one or more selected source fields; wherein the value of each destination field is the resulting value of the sum of the values of the selected source fields after application of the source-side function; and determining whether to apply a destination-side function to one or more of the destination fields; and, if a destination-side function is applied to the destination fields, associating one or more destination-side functions with the one or more of the selected destination fields, wherein the destination-side functions modify the additional information added to the destination field from the associated source fields, wherein the value of the destination field is the resulting value of first summing the values of the associated source fields and then applying the destination-side function;

receiving at least one incoming transaction from at least one sending trading partner, automatically applying one or more business rules to the at least one incoming transaction to identify one or more source fields of the administration system that contain information to be added to one or more information fields of the at least one incoming transaction;

automatically reading the identified additional information from one or more source fields of the administration system in response to receiving the incoming transaction from the at least one sending trading partner;

automatically modifying the additional information read from the source fields using one or more of the source-side functions or one or more of the destination-side functions;

automatically selecting one or more destination fields using pathways established in the generated map;

automatically adding the modified additional information to the one or more selected destination fields;

automatically generating at least one outgoing transaction, wherein the at least one outgoing transaction comprises data from the incoming transaction and the modified additional information read from one or more source fields of the administrative system;

automatically translating at least one outgoing transaction into a format readable by a receiving trading partner; and automatically sending at least one outgoing transaction to the at least one receiving trading partner.

22. The carrier medium of claim 21, wherein at least one business rule comprises one or more keywords.

23. The carrier medium of claim 21, wherein at least one business rule comprises one or more logical operators.

24. The carrier medium of claim 21, wherein at least one business rule comprises a string of at least one keyword and at least one operator, and wherein at least one business rule is entered into the computer system by a user via a user interface.

25. The carrier medium of claim 21, wherein at least one business rule is stored in a database.

26. The carrier medium of claim 21, wherein the map is specified by a user through a user interface.

27. The carrier medium of claim 21, wherein the program instructions are further executable by the computer system to implement storing a schedule in memory, wherein the schedule relates to at least one incoming transaction, and wherein the schedule comprises a predetermined time for receiving at least one incoming transaction from the at least one sending trading partner.

28. The carrier medium of claim 21, wherein the program instructions are further executable by the computer system to implement storing a schedule in memory, wherein the schedule relates to at least one incoming transaction, and wherein the schedule comprises a predetermined time for reading the additional information from the administration system.

29. The carrier medium of claim 21, wherein the program instructions are further executable by the computer system to implement storing a schedule in memory, wherein the schedule relates to at least one outgoing transaction, and wherein the schedule comprises a predetermined time for sending at least one outgoing transaction to the at least one receiving trading partner.

30. The carrier medium of claim 21, wherein at least one business rule comprises search criteria.

31. The carrier medium of claim 30, wherein the search criteria comprise one or more keywords.

32. The carrier medium of claim 21, wherein the program instructions are further executable by the computer system to implement queuing at least one outgoing transaction in response to generating at least one outgoing transaction.

33. The carrier medium of claim 21, wherein at least one outgoing transaction is sent to the at least one receiving trading partner through an industry clearinghouse.

34. The carrier medium of claim 21, wherein at least one incoming transaction is an insurance-related transaction.

35. The carrier medium of claim 21, wherein at least one outgoing transaction is an insurance-related transaction.

36. The carrier medium of claim 21, wherein the at least one outgoing transaction is an annuity asset pricing transaction.

37. The carrier medium of claim 21, wherein the at least one outgoing transaction is a positions and valuation focused refresh transaction.

38. The carrier medium of claim 21, wherein the at least one outgoing transaction is a positions and valuation full refresh transaction.

39. The carrier medium of claim 21, wherein at least one outgoing transaction is an insurance pricing transaction.

40. The carrier medium of claim 21, wherein at least one outgoing transaction is a commission settlement transaction.

41. The carrier medium of claim 21, wherein at least one sending trading partner is the receiving trading partner.

42. The carrier medium of claim 21, wherein the carrier medium is a memory medium.

43. The carrier medium of claim 21, wherein at least one business rule comprises a receiving trading partner identifier.

44. The carrier medium of claim 21, wherein at least one business rule comprises an administration system identifier.

45. The carrier medium of claim 21, wherein at least one business rule comprises a transaction identifier.

46. The carrier medium of claim 21, wherein at least one business rule comprises a transaction status.

47. The carrier medium of claim 1, wherein at least one business rule comprises a sending trading partner identifier.

* * * * *